United States Patent [19]

Purcell

[11] Patent Number: 4,923,257
[45] Date of Patent: May 8, 1990

[54] BELTED VEHICLE SUSPENSION SYSTEM
[75] Inventor: Robert J. Purcell, Washington, Ill.
[73] Assignee: Caterpillar Inc., Peoria, Ill.
[21] Appl. No.: 337,238
[22] Filed: Apr. 13, 1989
[51] Int. Cl.⁵ .......................................... B62D 55/104
[52] U.S. Cl. ...................................... 305/29; 180/9.1; 280/28.5
[58] Field of Search ........................ 305/10, 29, 31, 32; 180/9.1; 280/28.5

[56] References Cited
U.S. PATENT DOCUMENTS

| | | | |
|---|---|---|---|
| 2,343,301 | 3/1944 | Knox | 305/10 X |
| 2,417,019 | 3/1947 | Sherman | 280/112 |
| 2,496,136 | 1/1950 | Smith | 305/29 X |
| 2,998,999 | 9/1961 | Hyler et al. | 305/31 |
| 3,841,424 | 10/1974 | Purcell et al. | 180/9.5 |
| 3,913,939 | 10/1975 | Sinclair et al. | 180/9.1 X |
| 3,917,306 | 11/1975 | Madler et al. | 280/104 |
| 4,222,578 | 9/1980 | Meisel, Jr. | 280/6.11 |
| 4,560,018 | 12/1985 | Satzler | 180/9.1 |
| 4,647,067 | 3/1987 | Paquette et al. | 280/676 |

Primary Examiner—Russell D. Stormer
Attorney, Agent, or Firm—Claude F. White

[57] ABSTRACT

A suspension system for a non-powered belted vehicle includes a pair of wheel assemblies positioned on each side of the vehicle, a flexible endless belt encircling each pair of wheel assemblies, and an axle assembly extending transverse to the wheel assemblies. The wheel assemblies are connected to the axle assembly by a plurality of pivotal arms and each pair of wheel assemblies are interconnected by a fluid actuated cylinder. Belted vehicles which utilize smooth wheels to frictionally engage the belt for driving and stopping the belt, require considerable tension between the wheels and the belt. High belt tension is desirable for driving and stopping but unnecessarily high belt tension is undesirable due to overstressing of vehicle components. The subject suspension system utilizes a variable load applied to the vehicle to increase the belt tension for efficient vehicle operation.

21 Claims, 6 Drawing Sheets

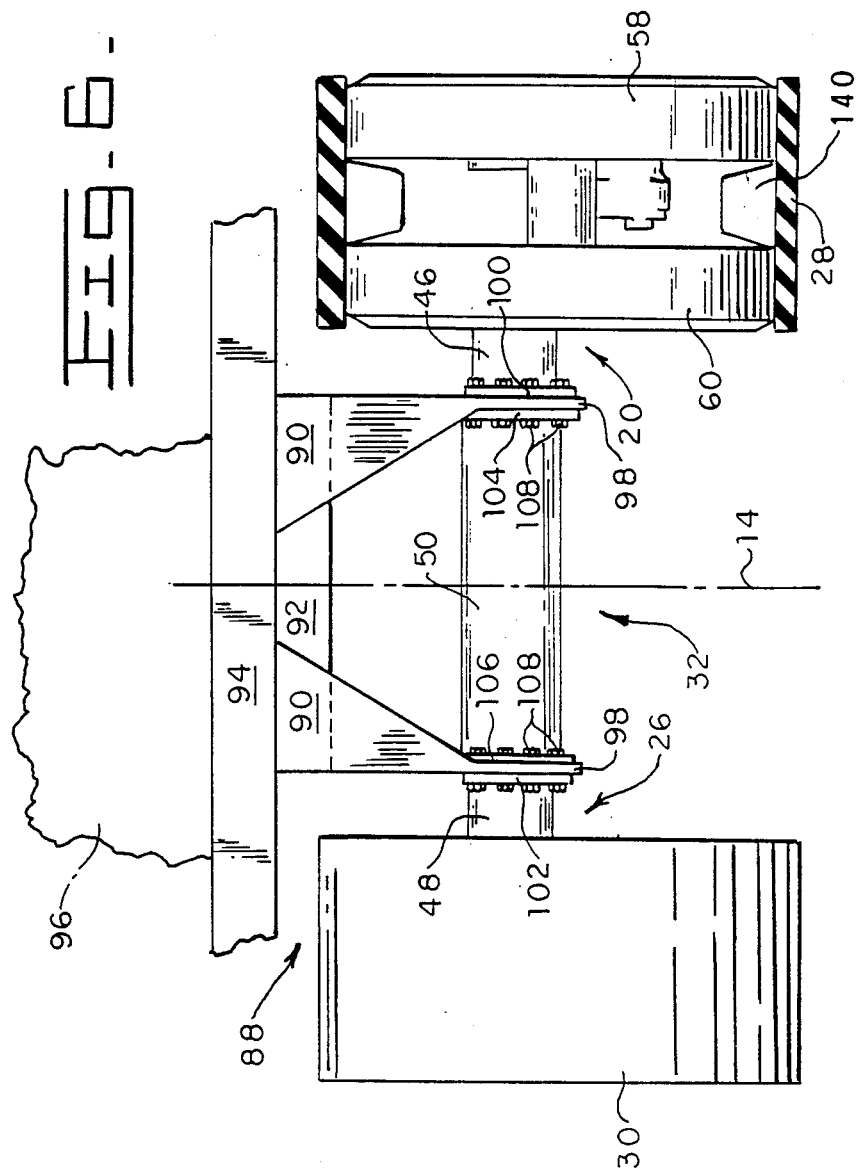

BELTED VEHICLE SUSPENSION SYSTEM

TECHNICAL FIELD

This invention relates generally to a suspension system for a vehicle having flexible endless ground engaging belts and more particularly to such a suspension system wherein a load applied to the vehicle increases the tension in the belts.

BACKGROUND ART

Construction, recreational, and work vehicles, which have flexible endless ground engaging belts for support and propulsion of the vehicle, generally utilize smooth surface drive wheels and similar idler wheels to engage and frictionally drive the flexible belts. Sufficient tension is necessary between the drive wheels and the belt, and between the idler wheels and the belt, to ensure efficient rotation of the belt and to provide effective stopping of the vehicle when the wheels are braked. Various mechanisms have been used to develop the requisite belt to wheel tension including fluid powered cylinders and compression springs. The prior art has also disclosed mechanisms providing that a portion of the vehicle weight can be used to provide some of the required tension between the flexible belt and the wheels.

One type of such a device is shown in U.S. Pat. No. 2,998,998, issued to J. H. Hyler et al. on Sept. 5, 1961. In this patent, a portion of the vehicle weight is transferred to a front wheel supporting mechanism through a cantilevered spring beam and an associated arm. The arm is connected to a rigid link, which link carries the front wheel supporting axles. The rigid link also carries a cylindrical member having a pivot axis. As a portion of the vehicle weight is applied to the beam and arm, the wheel axles are pivoted about the pivot axis in a direction away from the rear wheel axle. Rubber bushings tightly engage the cylindrical member and are torsionally deformed during the pivoting of the front wheel axles. As the front wheel axles pivot, the distance between the front and rear wheels increases and track tension is increased.

Although the above-noted track tensioning device does provide for tensioning the track in response to supporting a portion of the vehicle weight, a considerable portion of the vehicle weight is supported by the non-moveable rear wheel axle. Since the front and rear axles are secured together by a connecting arm, a rubber bushing must be twisted or deformed in order to allow the front wheels to pivot or rotate relative to the rear wheels. The total movement of the front wheels would appear to be limited by the twisting action of the rubber bushings. The disclosed vehicle is a self-powered vehicle, intended to push or pull other non-powered implements. Therefore, the total weight of the vehicle, which is supported in part by the load responsive device, is not intended to vary appreciably.

The present invention is directed to overcoming one or more of the problems as set forth above.

DISCLOSURE OF THE INVENTION

In one aspect of the present invention, a suspension system for a belted vehicle has a pair of wheel assemblies positioned on each side of the vehicle and a flexible endless belt encircles each pair of wheel assemblies. An axle member extends across the vehicle and each wheel assembly is pivotally connected to the axle by an arm. An adjustable link connects the first pair of wheel assemblies and another adjustable link connects the second pair of wheel assemblies. The suspension system further includes means for applying a downwardly directed force to the axle member.

Many belted vehicles, which have a flexible endless belt encircling one or more drive and idler wheels, rely on friction between the belt and the drive/idler wheels to rotate the belt and propel the vehicle. This same frictional force is used to stop the vehicle when the drive or idler wheels are braked. Adequate tension in the endless belt is necessary to maintain this frictional force under all types of operating conditions and environments. If adequate tension is not maintained, slippage between the belt and the wheels can occur, resulting in inefficient vehicle operations and poor braking.

The subject invention ensures that the tension in the endless belt is maintained at a sufficiently high level during various operating conditions of the vehicle. The subject invention further utilizes a load applied to the vehicle to increase the tension in the endless belts.

BRIEF DESCRIPTION OF THE DRAWINGS

FIG. 6 is a diagrammatic rear view, partly in section, taken generally along lines VI—VI of FIG. 1.

THE BEST MODE FOR CARRYING OUT THE INVENTION

Figure 1:
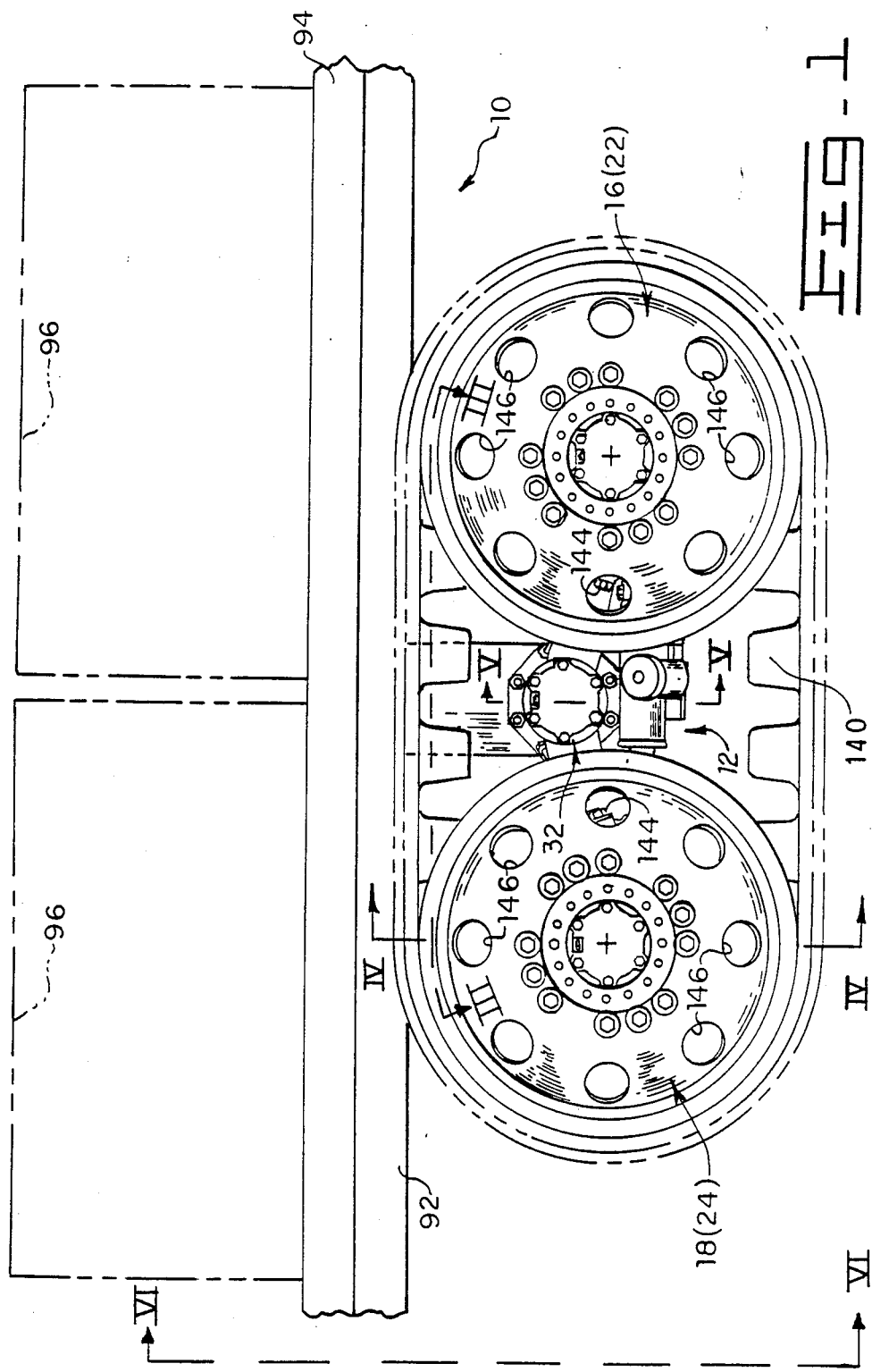
FIG. 1 is a diagrammatic side elevational view, with portions broken away, of a vehicle incorporating the suspension system of the present invention.

Referring to the drawings, a belted vehicle 10, such as a non-powered trailer type vehicle 10, has a suspension system 12, and a longitudinal centerline 14. The suspension system 12 includes first and second wheel assemblies 16,18 positioned on a first side 20 of the vehicle centerline 14 and third and fourth wheel assemblies 22,24 positioned on a second opposed side 26 of the vehicle centerline 14. A first flexible non-metallic endless belt 28 encircles the first and second wheel assemblies 16, 18, and a second similar belt 30 encircles the third and fourth wheel assemblies 22,24.

The suspension system 12 further includes an axle assembly 32 extending transverse to the centerline 14, a plurality of pivot arms 34,36,38,40, and first and second fluid pressure assemblies, or adjustable force inducing means 42,44. The axle assembly 32 has first and second end portions 46,48 and a central portion 50, with the first end portion 46 positioned intermediate the first and second wheel assemblies 16,18 and the second end portion 48 positioned intermediate the third and fourth wheel assemblies 22,24. The axle assembly 32 connects the first and second wheel assemblies 16,18 to the third and fourth wheel assemblies 22,24 by means of the pivot arms 34,36,38,40. More specifically, each of the first and second arms 34,36 has a first end portion 52 which pivotally connects the arms 34,36 to the first end portion 46 of the axle assembly 32. In a similar manner, each of the third and fourth arms 38,40 has a first end portion 54 which pivotally connects the arms 38,40 to the second end portion of the axle assembly. Since both sides 20,26 of the vehicle are substantially identical, only the details of the first side 20 are illustrated in the drawings, and the description of the parts and assemblies of the first side 20 applies equally to the second side 26.

Each of the wheel assemblies 16,18,22,24 has a hub portion 56, first and second spaced apart parallel wheels 58, 60, and a splined shaft 62 which connects the first and second wheels together. Each hub portion 56 has first and second radial connecting extensions 64,66, with each of the first extensions 64 being releasably connected to one of the pivot arms 34,36,38,40, and each of the second extensions 66 being releasably connected to one of the fluid pressure assemblies 42,44. The first and second wheel assemblies 16,18 are therefore interconnected by the fluid assembly 42 and two of the second extensions 66, and the third and fourth wheel assemblies 22,24 are interconnected by the fluid assembly 44 and two of the second extensions 66.

Each of the fluid pressure assemblies 42,44 includes a fluid actuated cylinder 68 and a gas charged accumulator 70. Each of the cylinders 68 includes a piston 72 slidably moveable within the cylinder 68 and a rod member 74 having first and second end portions 76,78. The first end portion 76 extends into the cylinder 68 and connects to the piston 72 and the second end portion 78 extends out of the cylinder 68 and is connected to one of the second radial extensions 66 by a pin 80. The pistons 72 divide each cylinder into first and second fluid chambers 82,84. The piston 72 has a plurality of axial bores 86 extending therethrough, with the bores 86 connecting the first and second chambers 82,84 and providing free flow of fluid between the fluid chambers 82,84.

The vehicle 10 includes means 88 for directing a downwardly directed force onto the axle assembly 32. The means 88 includes a plurality of supporting brackets 90 secured to the axle assembly 32 and a frame structure 92 secured to the brackets 90. The frame structure 92 includes a load supporting platform 94 positioned at a higher vertical elevation than the wheel assemblies 16,18,22,24. The platform 94 is adapted to support a variable load 96. Each bracket 90 includes a collar 98 which serves to secure the brackets to the axle assembly 32. The first and second axle end portions 46,48 have respectively radially extending flanges 100,102. The axle central portion 50 has similar first and second radially extending flanges 104,106 which are adapted to mate respectively with the flanges 100,102. Each of the collars 98 is positioned between the mating flanges 100,104 and 102, 106, and releasable securing means, such as threaded fasteners 108, secure the mating flanges and collars together. The frame structure 92 and the platform 94 are therefore securely supported on the axle assembly 32.

Figure 3:
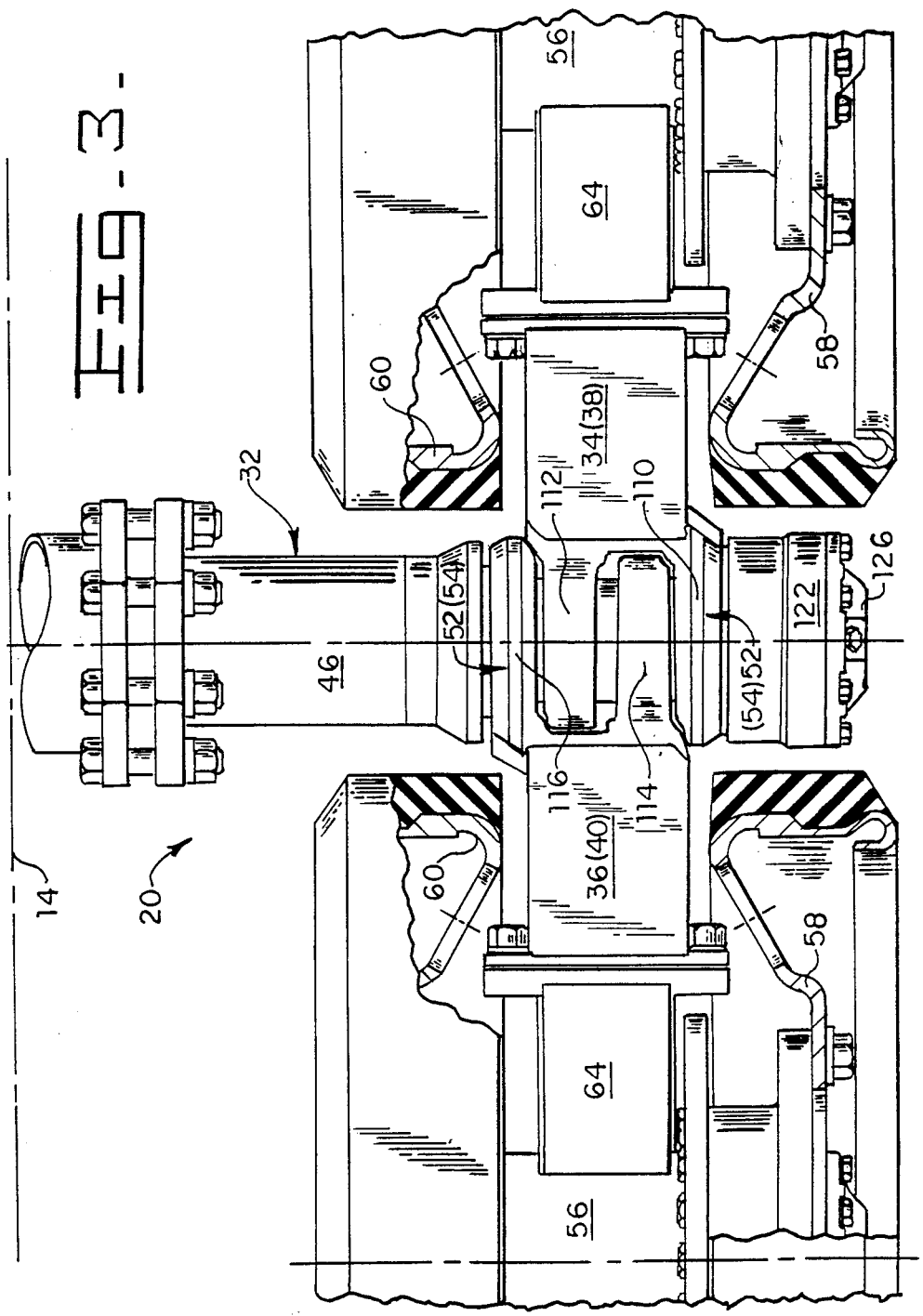
FIG. 3 is an enlarged diagrammatic plan view, partly in section, taken generally along lines III—III of FIG. 1.
Figure 5:
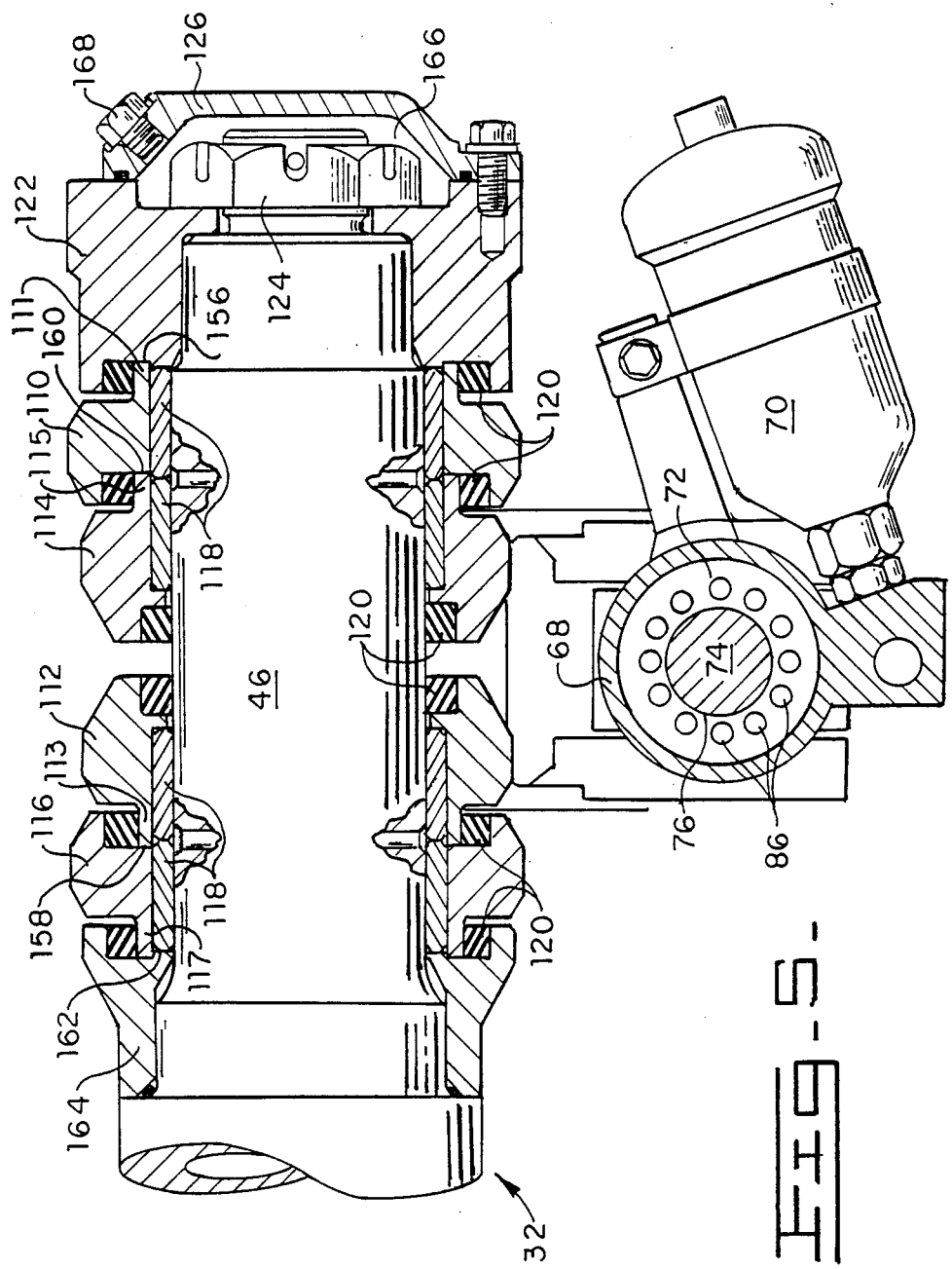
FIG. 5 is an enlarged diagrammatic sectional view taken generally along lines V—V of FIG. 1.

With particular reference to FIGS. 3 and 5, the first end portion 52 of the pivot arm 34 has first and second spaced apart forked journals 110,112. Likewise, the first end portion 52 of the pivot arm 36 has similar first and second spaced apart forked journals 114,116. All of the forked journals 110,112,116,116, encircle the first end portion 46 of the axle assembly 32 with the forked journals 110,112 being alternately interspersed respectively with the forked journals 114,116. A plurality of bearings 118 are positioned between the journals 110,112,114,116 and the first end portion 46 of the axle assembly 32. A plurality of seals 120 prevent lubricating fluid from leaking out of the axle assembly 32. An end cap 122 and a threaded nut 124 secure the arms 34,36 in position on the axle assembly 32. A cover plate 126 is fastened to the end cap 122 and closes off and seals the end of the axle assembly 32.

Figure 4:
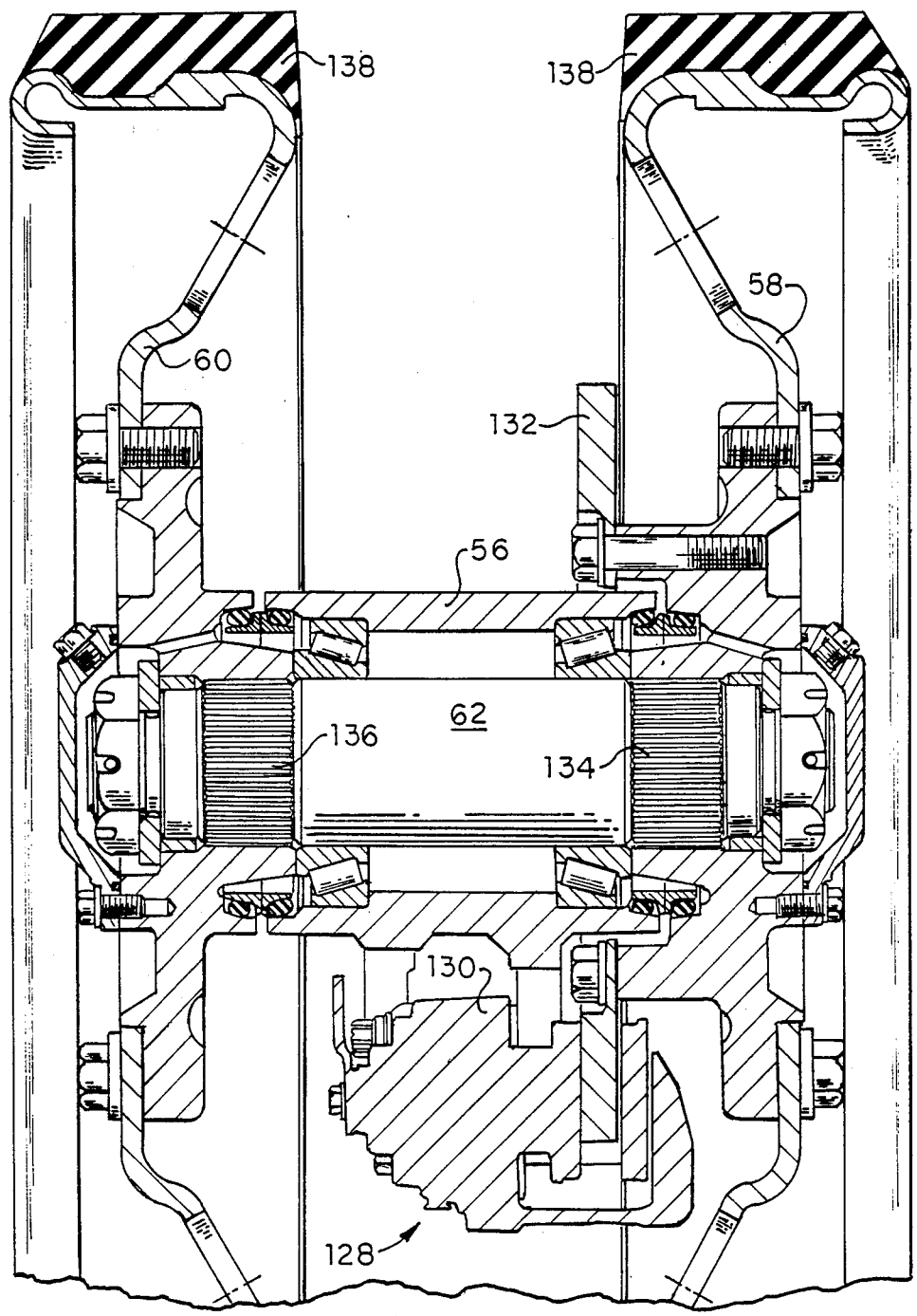
FIG. 4 is an enlarged diagrammatic sectional view taken generally along lines IV—IV of FIG. 1.

With particular reference to FIGS. 4, each wheel assembly 16, 18 includes a brake mechanism 128, including a brake actuator 130 secured to the non-rotatable hub portion 56, and a brake disc 132 secured to the rotatable wheel 58. Since the wheel 58 is secured to the shaft 62 by mating splines 134, and the wheel 60 is secured to the shaft 62 by mating splines 136, applying the brake actuator 130 to the brake disc 132 will brake both wheels 58 and 60. Each wheel 58,60 of each wheel assembly 16,18 has a layer 138 of resilient non-metallic material secured to the outer circumferential surface. The resilient layer 138 frictionally engages the flexible belts 28,30 to rotate the belts during movement of the vehicle 10 and to stop the belts during braking of the vehicle 10.

Figure 2:
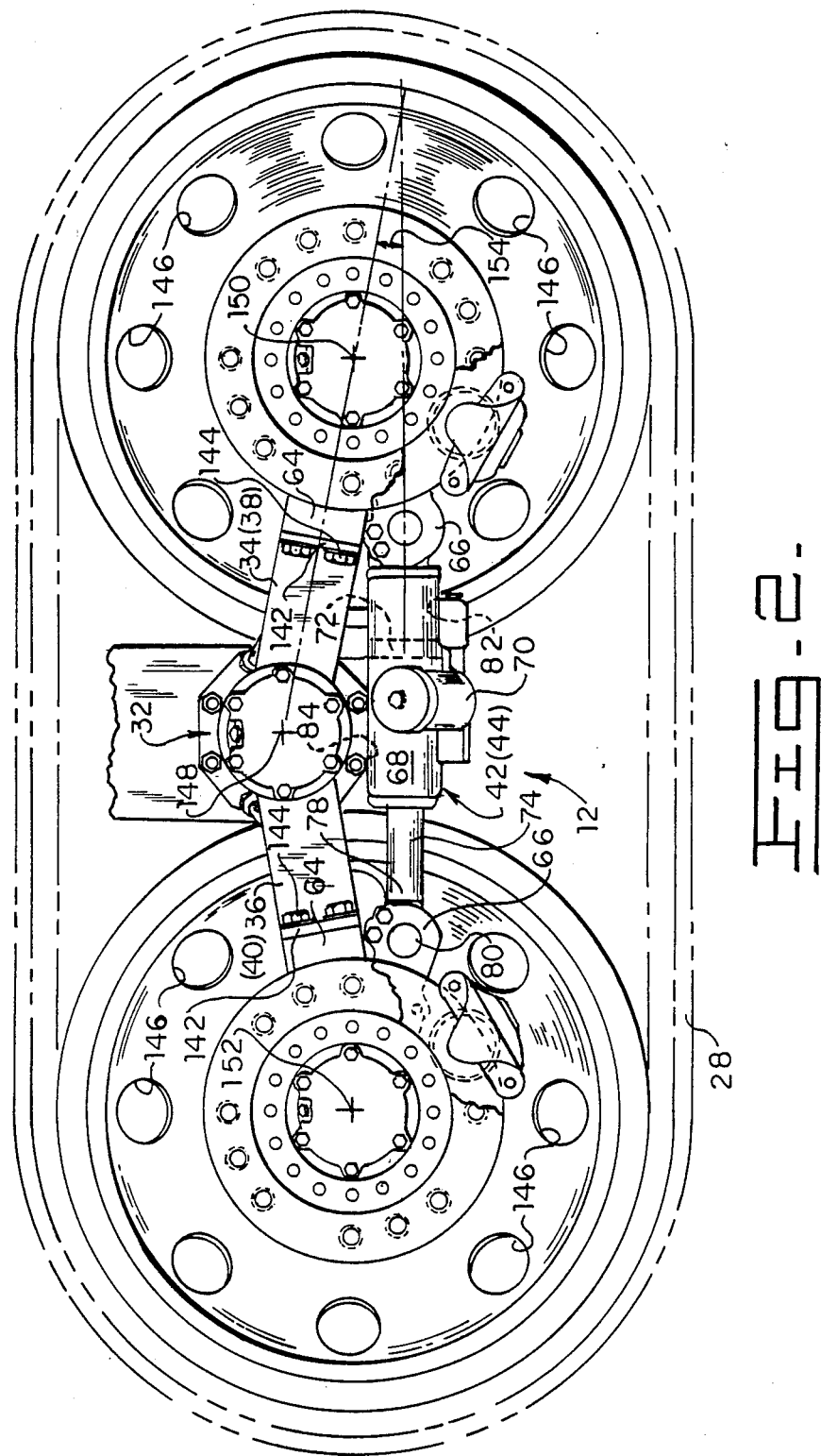
FIG. 2 is an enlarged diagrammatic side elevational view, similar to FIG. 1, with the outside set of wheels removed.

With particular reference to FIGS. 1, 2, and 6, each of the belts 28,30 includes a plurality of guide members 140 secured to the inner surface of the belts 28,30. The guide members 140 help keep the belts 28,30 on the wheel assemblies 16,18 and assist in maintaining the belts 28,30 in a substantially center position on the wheels 58,60. If the belts 28,30 should want to run to the left or right, variable thickness adjusting shims 142 can be added or removed at the connecting joint between the pivoting arms 34,36 and the radial extensions 64. The connecting joints include a plurality of threaded fasteners 144 which can be loosened or removed to add or remove the shims 142. Each of the wheels 58,60 in each wheel assembly 16,18,22,24 has a plurality of access holes 146. The access holes allow the threaded fasteners to be reached, and shims added or removed, without removing any of the wheels 58,60.

With particular reference to FIGS. 1 and 2, the axle assembly 32 has an axial centerline 148 and the wheel assemblies 16,18 have axial centerlines 150,152 respectively. The centerline 148 of the axle assembly 32 is positioned at a greater elevation than the centerlines 150,152 of the wheel assemblies 16,18. Each of the arms 34,36 forms an angle 154 with the force inducing means 68 in the range of about 7° to 25°. For the particular size vehicle illustrated, the angle 154 is preferably about 11° to attain the desired belt tension. The belt tension is a function of the force applied by the fluid cylinder 68 and by the load 96 applied to the axle assembly 32. With an angle 154 of about 11°, the desired belt tension can be attained with either a minimum or zero load 96 or a maximum load 96 of about 15000 lbs. with substantially the same force exerted by the fluid cylinder 68. For a large size vehicle 10, having considerably larger wheel assemblies 16,18, the preferred angle 154 may be as much as 25°.

With particular reference to FIGS. 3 and 5, the first and second end portions 46,48 of the axle assembly 32 are sealed and lubricated to provide long life and trouble free service of the axle assembly 32 and the pivot arms 34,36,38,40. Dimensional tolerances of the bearings 188 and the forked journals 110,112,114,116 are important to insure the axle assembly is properly sealed during assembly. Each forked journal 110,112,114,166 has a respective leg 111,113,115,117 which is dimensioned to provide a slight clearance with the mating components at respective areas 156,158,160,162. Prior to assembly of the forked journals 110,112,114,116 to the axle assembly 32, the seals 120 are installed into the respective journals, the end cap 122, and the axle stop ring 164. The bearings 118 are also pressed into each of the forked journals. The journals are then ready to be installed onto the axle assembly 32.

The forked journal 116 is initially pressed onto the outer end of the axle end portion 46, followed by the forked journal 112. The forked journals 114 and 112 are sequentially assembled to the axle end portion 46 and all the journal portions are pressed toward the stop ring 164. Final assembly position is established by the end cap 122 which presses against the bearing 118. At the final assembled position, the bearings 118 associated with the forked journals 110 and 114 contact each other and the bearings 118 associated with the journal 116 contacts the stop ring 164 and the bearings 118 associated with the journal 110 contacts the end cap 122. Because of the slight clearances the forked journals 110,112,114,116 can pivot on the bearings without generating friction. Lubrication for the pivoting motion of the journals 110,112,114,116 is provided by a fluid reservoir 166 provided by the cover plate 126. Fluid can be supplied to the reservoir 166 through a filler plug 168. The legs 111,113,115,117 hold the respective associated seals 120 in place.

INDUSTRIAL APPLICABILITY

With reference to the drawings, the subject suspension system 12 is particularly useful with a belted vehicle, and more specifically, a non-powered belted vehicle 10 which is intended to be towed behind a separate powered vehicle.

At initial assembly of the subject suspension system 12, the fluid cylinder 68 and gas accumulator 70 are not pressurized, or charged, and the rod member 74 is withdrawn mostly into the cylinder 68. In this situation, the first wheel assembly 16 is drawn closer to the second wheel assembly 18 because of the upward pivoting action of the pivot arms 34,36. The flexible belts 28,30 are now easily positioned around the wheel assemblies 16,18,22,24 and the fluid cylinder 68 and gas accumulator 70 are then charged respectively with hydraulic fluid and compressed gas. To provide a desired belt tension of 3000 lbs., with no load applied to the vehicle platform, the cylinder 68 is charged to about 800 P.S.I. after the gas accumulator 70 is precharged to about 650 P.S.I. As the cylinder 68 is being charged, the rod member 74 moves outwardly of the cylinder 68, thereby pivoting the arms 34,36 downwardly about the axle assembly 32 and moving the first wheel assembly 16 away from the second wheel assembly 18. This wheel assembly movement tensions the belt 28 to the proper tension.

The belt tension of about 3000 lbs. is adequate to provide sufficient frictional engagement between the wheels 58,60 and the belt 28 to properly rotate the belt 28 and wheels 58,60 as the vehicle is towed. This belt tension is also adequate to provide braking of the vehicle as the brake mechanisms 128 are activated. However, when a load 96 is applied to the platform 94, and thus to the vehicle 10, additional belt tension is desirable and necessary for efficient operation of the vehicle 10. The subject suspension system 12 supplies the additional belt tension in direct response to the applied load 96.

The platform 94, which supports the load 96, is connected to the axle assembly 32 by the brackets 90 and the frame structure 92. The load 96 is therefore applied directly to the axle assembly 32 which causes the arms 34,36 to pivot downwardly. This downward motion of the arms 34,36, moves the wheel assemblies 16,18 away from each other, and causes the rod member 74 to move outwardly of the cylinder 68. Since the wheel assemblies are substantially restrained by the inextensible belt 28, any movement of the wheel assemblies 16,18 away from each other increases the belt tension. With a recommended load 96 of 15,000 lbs., the desired belt tension, produced by the subject suspension system is about 13,000 lbs. This tension will provide the necessary friction between the belt 28 and the wheels 58,60 to properly operate and brake the vehicle 10, with a load 96 of about 15,000 lbs.

As the rod member 74 moves outwardly of the cylinder 68, the piston 72, which is attached to the rod member 74 within the cylinder 68, is also displaced within the cylinder 68. As the piston 72 moves forward, pressurized fluid within the cylinder 68 and in front of the piston 72 moves to the rear of the piston 72 through the bores 86. In a similar manner, when the piston 72 moves rearwardly, fluid is displaced from the rear side of the piston 72 to the front of the piston 72 through the bores 86. This arrangement requires no additional reservoir of fluid. Only a small amount of additional makeup fluid is required when the rod member 74 moves out of the cylinder 68. This makeup fluid is supplied by the gas charged accumulator 70, which holds a reserve of fluid and is in fluid communication with the cylinder 68.

Once the load 96 is removed from the platform 94, the suspension system 12 resumes its previous no-load condition and the belt tension decreases to about 3000 lbs. This is accomplished by the pivot arms 34,36 pivoting upwardly about the axle assembly 32 and the wheels 58,60 moving toward each other. At the same time, the rod member 74 moves inwardly of the cylinder 68 and displaces a small amount o pressurized fluid into the accumulator 70.

Other aspects, objects, and advantages of this invention can be obtained from a study of the drawings, the disclosure, and the appended claims.

I claim:

1. A suspension system for a vehicle having a longitudinal centerline, comprising:
   first and second wheel assemblies positioned on a first side of said centerline;
   third and fourth wheel assemblies positioned on a second opposed side of said centerline;
   a first flexible endless belt encircling said first and second wheel assemblies;
   a second flexible endless belt encircling said third and fourth wheel assemblies;
   an axle assembly having first and second end portions and a central portion and extending transverse to said centerline, said first end portion positioned intermediate said first and second wheel assemblies and said second end portion positioned intermediate said third and fourth wheel assemblies;
   first and second arms pivotally connecting said first and second wheel assemblies respectively to said first end portion of said axle assembly;
   third and fourth arms pivotally connecting said third and fourth wheel assemblies respectively to said second end portion of said axle assembly;
   a first adjustable force inducing means connecting said first wheel assembly to said second wheel assembly;

a second adjustable force inducing means connecting said third wheel assembly to said fourth wheel assembly; and means for directing a downwardly directed force onto said axle assembly.

2. The suspension system, as set forth in claim 1, wherein each wheel assembly includes first and second spaced apart parallel wheels and a connecting shaft splined to each of said first and second wheels.

3. The suspension system, as set forth in claim 1, wherein each wheel assembly has an axial centerline and the axle assembly has a centerline, said axle assembly centerline being positioned at a greater elevation than the axial centerlines of said wheel assemblies.

4. The suspension system, as set forth in claim 1, wherein each of said first and second force inducing means includes a fluid actuated cylinder and a gas charged accumulator.

5. The suspension system, as set forth in claim 1, wherein each of said axle end portions has a radially extending flange, said central portion has first and second radially extending flanges adapted to mate with said flanges on said end portions, and means for releasably securing said mated flanges together.

6. The suspension system, as set forth in claim 1, wherein each of said arms and respective force inducing means forms an angle in the range of 7 degrees to 25 degrees.

7. The suspension system, as set forth in claim 1, wherein said means for directing a downwardly directed force onto said axle assembly includes a plurality of brackets secured to said axle assembly, and a frame structure secured to said brackets, said frame structure including a load supporting platform positioned at a higher vertical elevation than said wheel assemblies.

8. The suspension system, as set forth in claim 1, wherein each wheel assembly includes a hub portion having a first connecting extension, said extension mating with and connecting one of said arms to a respective wheel assembly.

9. The suspension system, as set forth in claim 8, wherein each wheel assembly includes a brake mechanism, said brake mechanism including a brake disc secured to only one of said first and second wheels, and a brake actuator secured to said hub.

10. The suspension system, as set forth in claim 8, including means for varying the spacing of each connection between said arms and said first connecting extensions.

11. The suspension system, as set forth in claim 8, wherein each hub portion has a second connecting extension connected to a respective force inducing means.

12. The suspension system, as set forth in claim 1, wherein each of said arms has a first end portion having first and second spaced apart forked journals encircling one of the first and second end portions of said axle assembly.

13. The suspension system, as set forth in claim 12, wherein the forked journals of said first and third arms are alternately interspersed respectively with the forked journals of said second and fourth arms.

14. A suspension system for a vehicle comprising:
first and second wheel assemblies positioned on a first side of said vehicle, and third and fourth wheel assemblies positioned on a second opposed side of said vehicle, each wheel assembly having a hub portion, first and second spaced apart wheels, and a shaft connecting the first and second wheels together;

a first flexible non-metallic endless belt encircling the first and second wheel assemblies;

a second flexible non-metallic endless belt encircling the third and fourth wheel assemblies;

an axle connecting said first and second wheel assemblies to said third and fourth wheel assemblies;

a plurality of pivot arms pivotally connecting said hub portions of said wheel assemblies to said axle;

first and second fluid pressure assemblies connecting respectively said first wheel assembly to said second wheel assembly and said third wheel assembly to said fourth wheel assembly;

a frame structure, including a load supporting platform positioned at a higher vertical elevation than said wheel assemblies; and a plurality of supporting brackets securing said frame structure to said axle.

15. The suspension system, as set forth in claim 14, wherein said pivot arms and said axle form a sealed and lubricated axle assembly.

16. The suspension system, as set forth in claim 14, including a plurality of bearings positioned between said pivot arms and said axle.

17. The suspension system, as set forth in claim 14, wherein each of said fluid pressure assemblies includes a fluid actuated cylinder and a gas charged accumulator.

18. The suspension system, as set forth in claim 17, wherein each of said fluid actuated cylinders includes a piston having a plurality of axial bores therethrough, said piston dividing said cylinder into first and second fluid chambers, and said bores connecting said first and second chambers.

19. The suspension system, as set forth in claim 14, wherein said hub portion of each wheel assembly includes first and second radial extensions, each of said first extensions being releasably connected to one of said pivot arms, and each of said second extensions being releasably connected to one of said fluid pressure assemblies.

20. The suspension system, as set forth in claim 19, including a plurality of adjusting shims, said shims being adapted to be releasably secured between each connection of said pivot arm and said first extension.

21. A suspension system for a vehicle having a longitudinal centerline, comprising:
first and second wheel assemblies positioned on a first side of said centerline;

third and fourth wheel assemblies positioned on a second opposed side of said centerline;

a first flexible endless belt encircling said first and second wheel assemblies;

a second flexible endless belt encircling said third and fourth wheel assemblies;

an axle assembly having first and second end portions and a central portion and extending transverse to said centerline, said first end portion positioned intermediate said first and second wheel assemblies and said second end portion positioned intermediate said third and fourth wheel assemblies;

first and second arms pivotally connecting said first and second wheel assemblies respectively to said first end portion of said axle assembly;

third and fourth arms pivotally connecting said third and fourth wheel assemblies respectively to said second end portion of said axle assembly, each of said first, second, third, and fourth arms having a first end portion having first and second spaced apart forked journals encircling one of the first and second end portions of said axle assembly, said forked journals of said first and third arms being alternately interspersed respectively with the forked journals of said second and fourth arms;

a first adjustable force inducing means connecting said first wheel assembly to said second wheel assembly;

a second adjustable force inducing means connecting said third wheel assembly to said fourth wheel assembly; and means for directing a downwardly directed force onto said axle assembly.

* * * * *